United States Patent [19]

Boszor

[11] Patent Number: 5,516,478

[45] Date of Patent: May 14, 1996

[54] LIMITED PRESSURE EXPANSION TOOLING

[75] Inventor: Samuel M. Boszor, Palm Beach Gardens, Fla.

[73] Assignee: United Technologies Corporation, Hartford, Conn.

[21] Appl. No.: 146,896

[22] Filed: Nov. 2, 1993

[51] Int. Cl.⁶ ................................................. B32B 31/04
[52] U.S. Cl. ........................... 264/258; 264/324; 264/325
[58] Field of Search ........................................ 264/324, 325, 264/338, 337, 257, 258

[56] References Cited

U.S. PATENT DOCUMENTS

| 4,889,668 | 12/1989 | Kemp | 264/257 |
| 5,051,224 | 9/1991 | Donatelli et al. | 264/257 |
| 5,061,418 | 10/1991 | Ware | 264/257 |
| 5,081,172 | 1/1992 | Chaffee et al. | 524/188 |
| 5,204,042 | 4/1993 | James et al. | 264/257 |

FOREIGN PATENT DOCUMENTS 457288  11/1991  European Pat. Off. ............... 264/338

*Primary Examiner*—Mark D. Sweet
*Attorney, Agent, or Firm*—Christopher T. Hayes

[57] ABSTRACT

A limited pressure expansion material that includes a plurality of microspheres uniformly dispersed throughout a thermally expansive material such as silicone rubber. Upon heating within a sealed curing device such as an autoclave, the pressure rise of the thermally expansive material is reduced near the pressure at which the microspheres begin to implode.

3 Claims, 2 Drawing Sheets

LIMITED PRESSURE EXPANSION TOOLING

DESCRIPTION

1. Technical Field

The present invention relates to the curing of composite articles, and particularly to articles that are cured in closed molds or autoclaves using expansion rubber tooling.

2. Background of the Invention

The goals of designers of both commercial and military aircraft include increasing fuel efficiency and performance. One way of obtaining both of these goals is to substitute lighter materials for the metal alloys that are used throughout the aircraft industry. Parts made from composite materials incorporating resins and fibers show great promise for reducing the weight of a given aircraft component while providing strength that is equal to or greater than the same part made of metal.

Unfortunately, present techniques for manufacturing composite articles that incorporate fibers are typically labor intensive, resulting in a cost-per-part that may be prohibitive for many aircraft applications. The "lay-up" for many composite parts must be done by hand, and for those parts which are cured in an autoclave the pressure required to consolidate polymer matrix composite parts must be controlled precisely to ensure correct consolidation of the composite materials.

One prior art method of curing composite lay-ups includes consolidating and curing the lay-ups in an autoclave while using silicone rubber to provide the necessary hydrostatic pressure for hollow sections such as struts or hat shaped stiffeners, or for inaccessible areas where the silicone expansion can push against restraining tooling. Because silicone rubber expands upon heating, the silicone rubber can be packed around the lay-up, and then the lay-up and silicone rubber can be sealed in the autoclave or other heat source and heated. As it is heated, the silicone rubber expands against the composite lay-up exerting pressure thereon. The pressure consolidates the lay-up, and maintains the consolidation until the composite part has cured.

As those skilled in the art will readily appreciate, the maximum pressure developed by the silicone rubber is determined by several criteria including the total expansion of the silicone rubber, the desired wall thickness of the composite part (often referred to as the "bulk factor"), the restraining tooling inner cavity dimensions, and the initial amount or volume of the silicone rubber. If the initial amount of silicone rubber is too small, heating of the silicone rubber will not produce sufficient pressure to compact and consolidate the lay-up. If, on the other hand, the initial amount of silicone rubber is too great, excessive pressure will be produced at the curing temperature of lay-up causing the silicone rubber to intrude into the plies of the lay-up resulting in delamination of the resulting composite part. Thus, when the pressure is either insufficient or excessive the overall yield of useable composite parts is reduced.

To prevent insufficient or excessive hydrostatic pressure from occurring within the autoclave during consolidation of the lay-up, the silicone rubber must be carefully packed about the lay-up based on the criteria stated above. Any error in packing the silicone rubber about the lay-up may result in insufficient or excessive pressure being applied to the lay-up, resulting in lost yield. Accordingly, use of prior art silicone rubber requires the efforts of a skilled technician to pack the silicone rubber against the lay-up, and precise calculations of the dimensions of the silicone rubber, adding to the cost of fabricating composite parts.

What is needed is a means of consolidating lay-ups of composite parts that increases yield of composite parts by reducing the likelihood that the hydrostatic pressure applied by the silicone rubber on the lay-up becomes excessive.

SUMMARY OF THE INVENTION

It is therefore an object of the present invention to provide a material for consolidating lay-ups that is less subject to applying excessive pressure to the lay-up than the prior art.

Another object of the present invention is to provide a method of consolidating lay-ups that is less subject to applying excessive pressure to the lay-up than the prior art.

According to the present invention, a limited pressure expansion material is provided which includes a plurality of hollow microspheres dispersed throughout a thermally expansive material. Each of the microspheres is subject to imploding at a pressure within a predetermined pressure range. Upon heating of the limited pressure expansion material, the hydrostatic pressure of the limited pressure expansion material rises to the predetermined pressure range, at which pressure the microspheres begin to implode. The volume freed up by the imploding microspheres provides volume for the thermally expansive material to expand into, thus limiting the increase in hydrostatic pressure as a function of temperature over the predetermined pressure range.

The foregoing and other features and advantages of the present invention will become more apparent from the following description and accompanying drawings.

PREFERRED EMBODIMENT OF THE PRESENT INVENTION

The present invention is a limited pressure expansion material for use in autoclaves or other curing devices such as presses or ovens to provide a relatively constant pressure to lay-ups of composite parts during the consolidation and curing thereof. As used herein, the term "lay-up" refers to a workpiece made of one or more materials which has been formed into a shape having dimensions nearly the same as the article to be produced from that workpiece, the workpiece needing to be consolidated and cured to produce the desired part. In the prior art method of consolidating a lay-up discussed above, a thermally expansive material such as silicone rubber is used to provide the necessary hydrostatic pressure. As used herein, the term "silicone rubber" means one of the silicone based polymers having rubber-like characteristics and typically identified commercially simply as "silicone".

Figure 1:
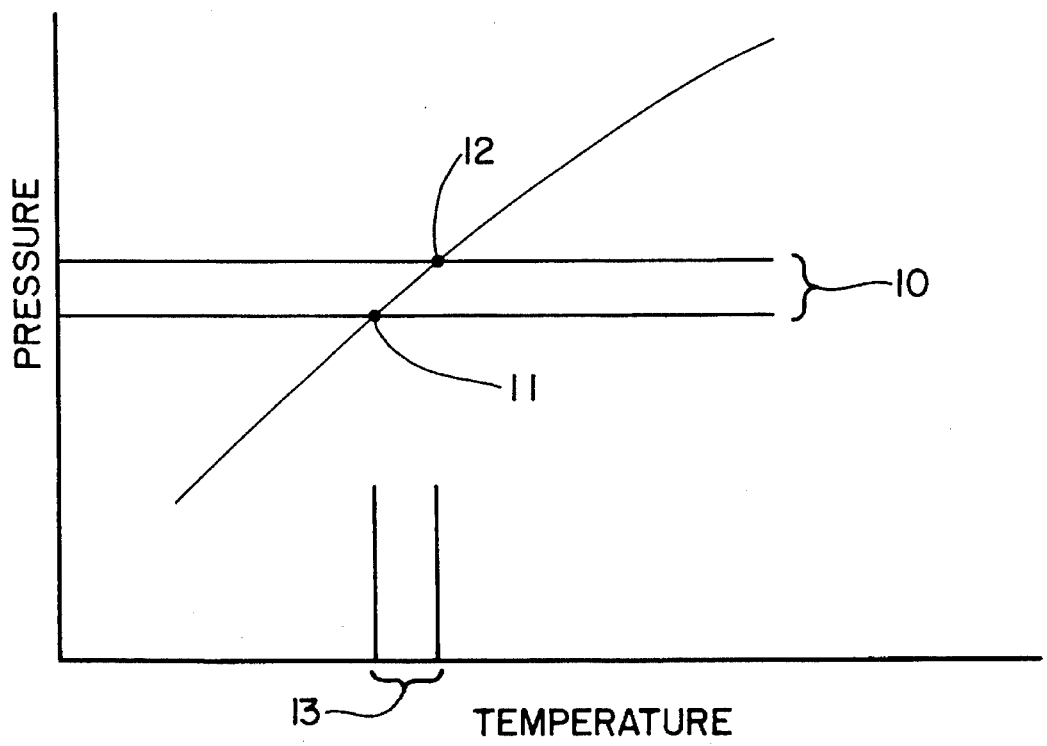
FIG. 1 is a graphical representation of a pressure versus temperature relationship for silicone rubber at constant volume.

As the silicone rubber is heated within the autoclave it tends to expand, the expansion being a function of the temperature and coefficient of thermal expansion for the particular silicone rubber material. If, as in the case of an autoclave or other device using fixed tooling, the expansion of the silicone rubber is limited to a fixed volume, the hydrostatic pressure of the silicone rubber increases as the temperature of the silicone rubber increases, as shown graphically in FIG. 1. Note that in order for correct consolidation of the lay-up, the hydrostatic pressure of the silicone rubber must be maintained within a predetermined pressure range 10 during curing of the lay-up.

The minimum allowable pressure 11, the minimum pressure necessary to consolidate the fibers and matrix into a composite part, defines the lowest pressure in the predetermined pressure range. The maximum allowable pressure 12, the maximum pressure that can safely be applied to the lay-up without causing the silicone rubber to intrude into the fibers and plies of the lay-up, defines the highest pressure in the predetermined pressure range. Note that because of the slope of the pressure curve in FIG. 1, the temperature of the silicone rubber must be maintained within a relatively narrow temperature range 13 to maintain the hydrostatic pressure of the silicone rubber within the predetermined pressure range 10.

The present invention comprises a material characterized in that the slope of the pressure curve decreases substantially within the predetermined pressure range 10. This limited pressure expansion material includes a volume of thermally expansive material, such as silicone rubber, that is substantially free of gas bubbles or other voids, and a plurality of hollow microspheres which are dispersed uniformly through out the silicone rubber. As used herein, the term "microsphere" refers to a substantially spherical shaped object having an outer diameter not greater than 0.2 millimeters and subject to implosion within a predetermined range of pressures. Hollow microspheres made of glass and having an outer diameter within a given range are commercially available from PQ Corporation, 500 Swedesford Road, Valley Forge, Pa. 19482. Although the present invention is shown and described with respect to glass microspheres, it is understood that microspheres made of other materials, such as carbon, would suffice as well.

Figure 2:
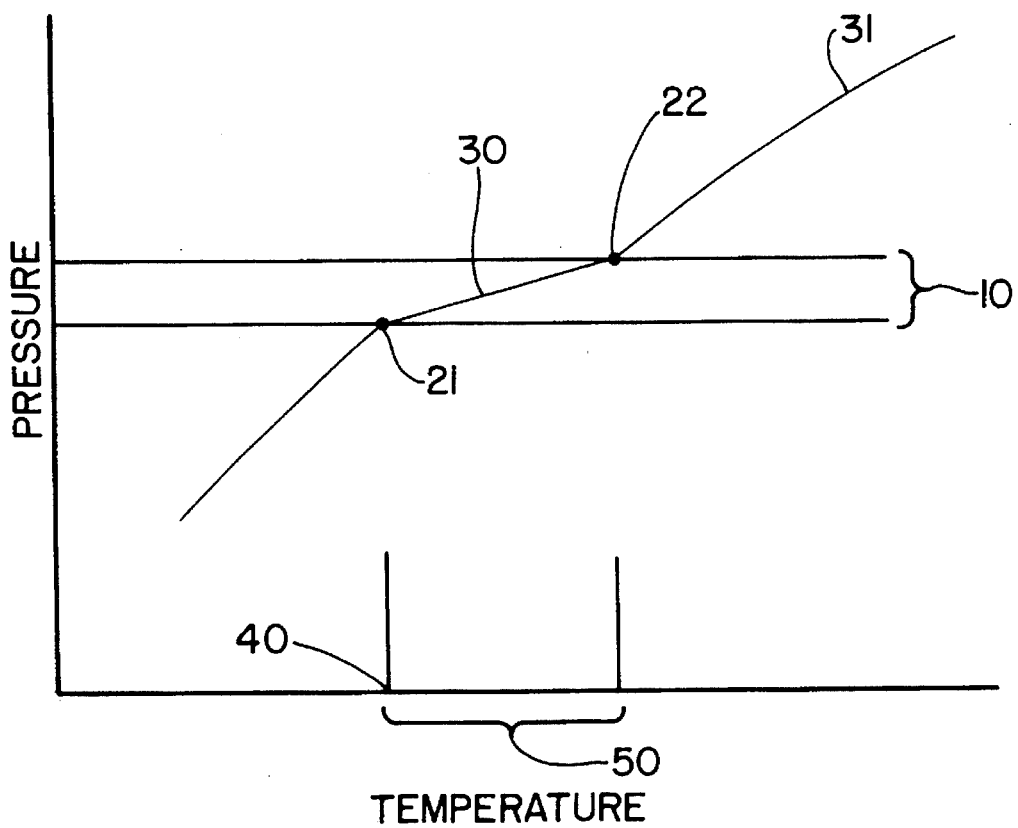
FIG. 2 is a graphical representation of a pressure versus temperature relationship for the limited pressure expansion material at constant volume.

These hollow microspheres have an outer wall thickness that is relatively constant from microsphere to microsphere for a given outer diameter, and therefore for microspheres of a given outer diameter (plus or minus a given tolerance) the pressure at which the microspheres will implode (plus or minus a given tolerance) is predictable and reproducible. For example, if the lay-up is to be consolidated at a silicone rubber hydrostatic pressure of approximately 1500 psia, glass microspheres having an outer diameter of 0.06 millimeters may be uniformly dispersed throughout the silicone rubber thereby forming the limited pressure expansion material of the present invention. Upon heating of the limited pressure expansion material in an autoclave, the hydrostatic pressure of the material increases as shown graphically in FIG. 2.

When the hydrostatic pressure reaches the point at which some of the microspheres begin to implode, the imploding microspheres decrease in volume and free up space for the silicone rubber to expand into. Due to the imploding microspheres, the slope 30 of the pressure curve 31 decreases to a reduced slope even as the temperature of the limited pressure expansion material continues to increase. The pressure curve remains at a reduced slope despite increasing temperature until the last of the microspheres has imploded, as shown graphically at point 22 of FIG. 2. Once that has occurred, continued increases in the temperature of the limited pressure expansion material produce an increase in the slope of the pressure curve 31 to approximately that of the slope of the pressure curve 31 before the first microspheres began to implode.

As those skilled in the art will readily appreciate, it is critical to the present invention that the microspheres (whether made of glass, carbon, etc.) are dimensioned so as to be subject to implosion within the desired pressure range 10. For a given material, it is of course a straight forward design process to determine the outer diameter and wall thickness necessary to produce a microsphere that will implode at a predetermined pressure. Thus the present invention is not limited to merely glass microspheres.

In using the present invention to limit the pressure applied to a lay-up of a composite article by a silicone rubber during consolidation of the lay-up in an autoclave or other heating device, one must first determine the minimum allowable pressure 21 necessary to consolidate the lay-up, as well as the maximum allowable pressure 22 at which the lay-up can be consolidated without causing the silicone rubber to intrude into the lay-up. The limited pressure expansion material of the present invention is prepared by uniformly dispersing the microspheres throughout a given volume of the silicone rubber, with each of the microspheres being dimensioned such that the microsphere is subject to implosion at a pressure no less than the minimum allowable pressure 21 and no greater than the maximum allowable pressure 22. As those skilled in the an will readily appreciate, it is important to ensure that the silicone rubber is substantially free of gas bubbles because if the gas bubbles are not substantially eliminated from the silicone rubber, the gas bubbles will provide additional volume for the silicone rubber to expand into upon heating and the silicone rubber may not reach the minimum allowable pressure needed to consolidate the pan.

The limited pressure expansion material is then packed about the lay-up within a cavity of the autoclave so as to substantially eliminate any voids from between the limited pressure expansion material and the lay-up, and so as to remove any voids from within the cavity. The lay-up and the limited pressure expansion material are then sealed inside the cavity and heated to a temperature 40 at which the pressure within the cavity exceeds the minimum allowable pressure 21 and at which the lay-up can be consolidated. As described above, the imploding microspheres limit the pressure of the silicone rubber to at or below the maximum allowable pressure 22 throughout the desired pressure range 10 over a desired temperature range 50 that is substantially greater than the prior art temperature range 13, thereby reducing the sensitivity of the hydrostatic pressure of the silicone rubber to the changes in temperature over the desired temperature range. The present invention thus increases yield of composite pans by reducing the likelihood that the hydrostatic pressure applied by the silicone rubber on the lay-up will become excessive.

Although this invention has been shown and described with respect to detailed embodiments thereof, it will be understood by those skilled in the art that various changes in form and detail thereof may be made without departing from the spirit and scope of the claimed invention.

I claim:
1. A method of limiting the pressure applied to a lay-up of a composite article by a thermally expansive material during consolidation thereof in a curing device, said lay-up having a minimum allowable pressure necessary to consolidate the lay-up and a maximum allowable pressure at which the lay-up can be consolidated without said material intruding into said lay-up, said method comprising:

provinding a limited pressure expansion material including a volume of said thermally expansive material, said volume substantially free of gas bubbles and having a plurality of hollow microspheres uniformly dispersed throughout said volume, each of said microspheres subject to implosion at a pressure no less than said minimum allowable pressure and no greater than said maximum allowable pressure;

packing said limited pressure expansion material about said lay-up within a cavity of said curing device so as to substantially eliminate any voids from between the limited pressure expansion material and the lay-up and from within the cavity; and, sealing the lay-up and the limited pressure expansion material inside said cavity and heating said limited pressure expansion material to a temperature at which the pressure exerted by the limited pressure expansion material within said cavity exceeds said minimum allowable pressure.

2. The method of claim 1 wherein the thermally expansive material is silicone rubber.

3. The method of claim 2 wherein the hollow microspheres are hollow and are made of glass.

* * * * *

UNITED STATES PATENT AND TRADEMARK OFFICE
CERTIFICATE OF CORRECTION

PATENT NO. : 5,516,478
DATED : May 14, 1996
INVENTOR(S) : Samuel M. Boszor

It is certified that error appears in the above-indentified patent and that said Letters Patent is hereby corrected as shown below:

In column 4, at line 34, change "pan" to --part--.
In column 4, at line 54, change "pans" to --parts--.
In claim 3, at line 1, delete "hollow".
In col. 6, claim 3, line 2, delete "are hollow and"--.

Signed and Sealed this

Third Day of June, 1997

BRUCE LEHMAN

Attest:

Attesting Officer

Commissioner of Patents and Trademarks